United States Patent [19]

Shawhan

[11] 4,156,229
[45] May 22, 1979

[54] BIT IDENTIFICATION SYSTEM FOR BOREHOLE ACOUSTICAL TELEMETRY SYSTEM

[75] Inventor: Elbert N. Shawhan, West Chester, Pa.

[73] Assignee: Sperry-Sun, Inc., Sugar Land, Tex.

[21] Appl. No.: 763,879

[22] Filed: Jan. 31, 1977

[51] Int. Cl.² ............................................. G01V 1/40
[52] U.S. Cl. .......................... 340/18 P; 340/18 FM; 340/18 NC; 328/127; 328/128; 325/320
[58] Field of Search .......... 340/18 FM, 18 P, 18 NC; 325/320, 323, 30; 328/127, 128; 329/122

[56] References Cited

U.S. PATENT DOCUMENTS

| | | | |
|---|---|---|---|
| 3,293,607 | 12/1966 | Kalbfell | 340/18 FM |
| 3,482,116 | 12/1969 | James | 328/127 |
| 3,501,704 | 3/1970 | Webb | 325/320 |
| 3,627,949 | 12/1971 | Krecic et al. | 325/320 |
| 3,778,794 | 12/1973 | Szabo et al. | 328/127 |
| 3,828,259 | 8/1974 | Riethmuller et al. | 328/128 |
| 3,886,495 | 5/1975 | Sexton et al. | 340/18 NC |
| 3,889,228 | 6/1975 | Shawhan | 340/18 FM |
| 3,895,280 | 7/1975 | Peterson | 328/127 |
| 3,904,970 | 9/1975 | Shawhan | 329/122 |
| 3,987,406 | 10/1976 | Broding | 325/30 |
| 4,001,698 | 1/1977 | Allred | 328/127 |
| 4,035,763 | 7/1977 | Cowles | 340/18 FM |

Primary Examiner—Nelson Moskowitz
Attorney, Agent, or Firm—M. Lee Murrah

[57] ABSTRACT

Binary bits that are represented by pulses are identified by circuitry that integrates a signal having a sequence of such pulses for the period of each bit pulse. At the end of the integrating period, the integrator level is stored, and the integrator is discharged. Storage and discharge are synchronized with the bit pulse rate by an oscillator whose frequency is varied until the integrator level is maximized. The presence of a bona fide signal bit is indicated by a predetermined integrator level. A false signal bit generated as part of the background noise will not endure long enough to cause the integrator to reach the predetermined level of a bona fide bit.

17 Claims, 8 Drawing Figures

BIT IDENTIFICATION SYSTEM FOR BOREHOLE ACOUSTICAL TELEMETRY SYSTEM

BACKGROUND OF THE INVENTION

The invention relates to identifying the informational significance of binary bits that are transmitted acoustically through a drill string by frequency-shift-keyed modulation. Systems have been previously developed for acoustically telemetering signals in boreholes. Typical of these systems are those disclosed in applicant's U.S. Pat. Nos. 3,889,228 and 3,930,220. Circuits have also been developed for detecting the telemetered signals in the presence of the high background noise associated with drilling boreholes. An example is found in Applicant's U.S. Pat. No. 4,019,148.

A convenient way of encoding information for transmission through a drill string in an acoustical telemetry system is frequency-shift-keyed modulation, although a single frequency system could be used. The information, which generally concerns borehole parameters such as inclination, pressure, or temperature, are converted from analog form to digitally coded words according to well-known digital methods. These digitally coded words are then used to modulate the frequency-shift-keyed (FSK) system. The FSK system represents digital data by shifting between two frequencies that are relatively close together but distinguishable. One frequency is used to represent a binary "0", and the other to represent a binary "1", and by shifting between the two frequencies in the proper sequence binary words can be represented. The encoded FSK signals can then be used to drive an electro-acoustical transducer, or other suitable device, which induces the desired signals into the drill string in the form of acoustical signals.

These acoustical signals are conducted along the drill string, generally from the bottom of the drill string to the surface. Attenuation may be compensated for by placing repeaters at regular intervals along the drill string.

Both of the surface and in each repeater the FSK signal must be detected, distinguished from the background noise and the informational significance of the components thereof identified.

OBJECTS AND SUMMARY OF THE INVENTION

An object of the invention is to distinguish a periodic data signal bit representative of a binary "0" or a "1" from a random noise burst in order that a noise burst is not identified and transmitted as a data bit. This object is accomplished by periodically integrating the signal, whether it be a data signal or a noise pulse. The integration rate is chosen to coincide with the data bit rate, in which case the contribution of the data bit regular in both duration and amplitude makes a significantly larger contribution to the final integrator output than a noise burst which is irregular in both amplitude and duration. If the final level of the integrator reaches a predetermined value, a data bit is indicated.

It is another object of the invention to synchronize the integrator with the downhole data bit rate. This object is accomplished by varying the integrator reset rate and phase to maximize the integrator output for a data bit. This is accomplished through the use of a reset control oscillator whose frequency is dependent upon the integrator output voltage. The oscillator in effect searches for a reset time and phase that will maximize the output of the oscillator, which in turn stabilizes the frequency of the reset control oscillator.

DESCRIPTION OF THE DRAWINGS

The invention may be more fully understood by studying the following Description of the Preferred Embodiments in conjunction with the appended drawings, wherein.

DESCRIPTION OF THE PREFERRED EMBODIMENTS

Figure 1:
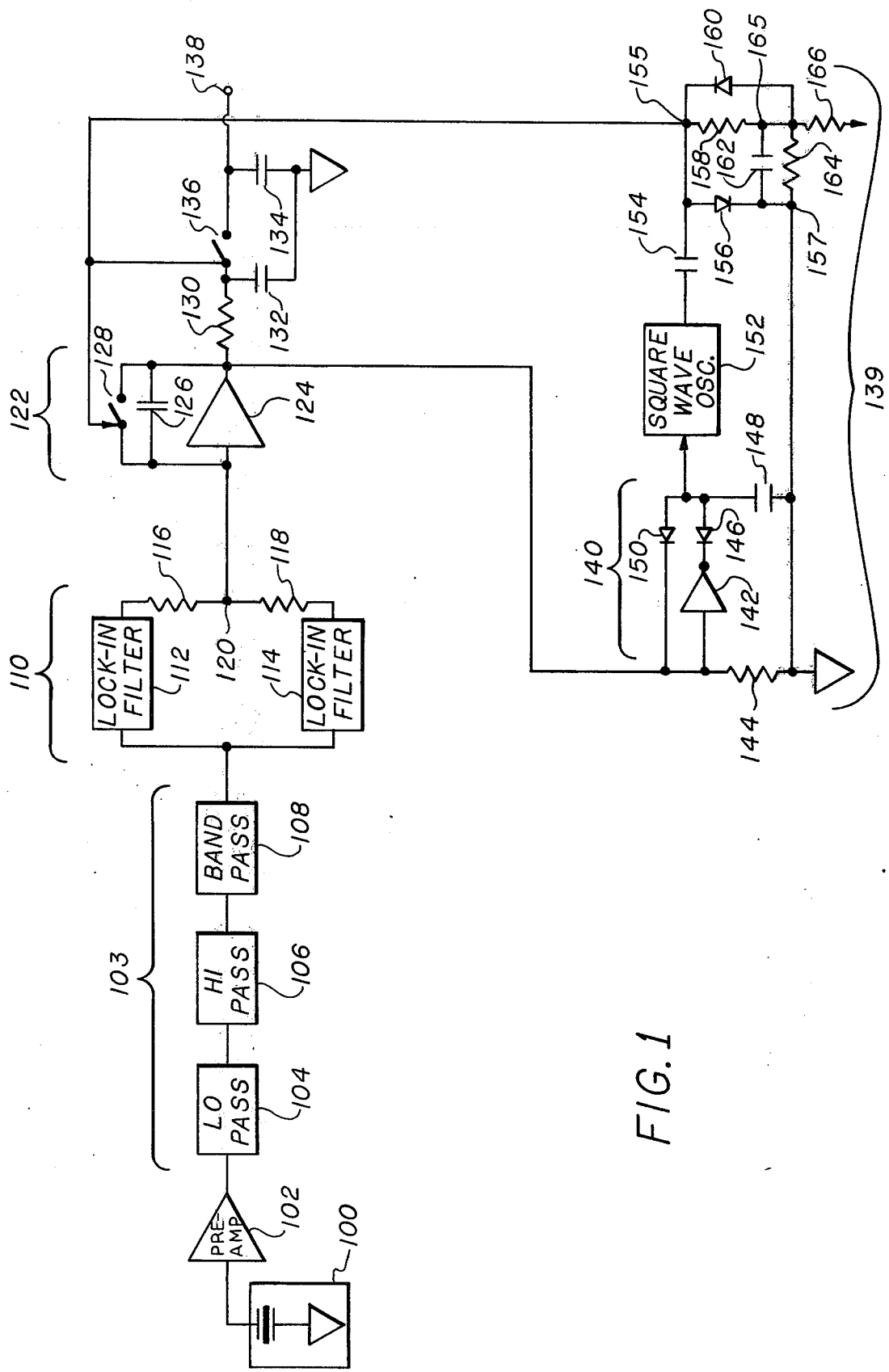
FIG. 1 is a block diagram of a receiver circuit embodying the present invention.

Referring to FIG. 1, a pick-up unit 100 is tightly coupled to the drill string in order that acoustical vibrations therein are transmitted into the pick-up unit. A sharp point or a small area on one of the surfaces that can be pressed into the other surface has been found to make the best contact between the drill string and the pick-up. It is preferable that pick-up 100 not be placed in unsupported metal sections that might be excited to vibrate and cause random phase displacement of the signal. The pick-up unit may be any of a number of types of transducers, but it has been found that an accelerometer is particularly applicable.

Pick-up 100 is connected in series with a preamplifier 102 and a series of cascaded active filters 103 comprising a low pass filter 104, a high pass filter 106 and a band pass filter 108. Following the cascaded filters is a lock-in filter circuit 110 comprising two parallel connected lock-in filters 112 and 114. Each of the lock-in filters 112 and 114 is designed to pass a particular frequency. Also a part of lock-in filter circuit 110 are resistors 116 and 118 connected between lock-in filters 112 and 114 respectively and a common node 120.

Node 120 is tied to the input of an integrator 122 comprising an operational amplifier 124 and a feedback circuit comprising a capacitor 126 and a switch 128, both connected in parallel. The output of operational amplifier 124 is connected through a resistor 130 to parallel grounded capacitors 132 and 134. Connected in series between the parallel capacitors is a switch 136. Capacitor 134 is connected to output 138.

The output of operational amplifier 124 is also connected to the input of a frequency control circuit 140, which comprises an operational amplifier 142 whose input is connected to a grounded resistor 144 and to the output of amplifier 124. The output of operational amplifier 142 is connected to the cathode of a diode 146. The anode of diode 146 is connected to a grounded capacitor 148 and to the anode of a diode 150, whose cathode is connected in a feedback configuration to the input of operational amplifier 142. Capacitor 148 and the anodes of diodes 146 and 150 are connected in series with a square wave oscillator 152 and a capacitor 154. Capacitor 154 is then connected at node 155 to the anode of a diode 156, a resistor 158 and the cathode of a diode 160. The cathode of diode 156 is grounded and connected at node 157 to a capacitor 162 and a resistor 164, both of which are connected at node 165 to resistor 158 and the anode of diode 160. Connected to node 165 is a resistor 166, which itself is connected to a negative power supply. Node 155 is connected to the controlling mechanism of switches 128 and 136.

In the operation of the circuit of FIG. 1, an acoustical signal is received by pick-up 100 and is converted to a varying voltage level. Preamplifier 102 raises the voltage level above the electrical noise on the conductor between preamplifier 102 and pick-up 100. Cascaded low pass filter 104 and high pass filter 106 reduce the noise outside the frequency range in which coverage is desired. Within this frequency range, it may be desirable to have a number of frequency bands. The particular band that is desired is selected by band pass filter 108. A selector switch may be used to shift the response to band pass filter 108 to cover the range whose reception is desired.

The signal passed by the cascaded filters thus consists of two components. In order to detect these signals in the presence of background noise that may be present in the band range of interest, a lock-in filter circuit 110 is used. Lock-in filter 112 is designed to pass only the lower frequency component of the nominal frequency and lock-in filter 114 is designed to pass only the upper frequency component, each of which frequencies may be used to represent either a "0" or "1" for the transmission of digital information, as was discussed above. Each of the lock-in filters provides a very narrow pass band, typically 5 Hz, for a high order of noise rejection and for rejection of the other transmitted frequency that is to be passed by the other lock-in filter in circuit 110. Filter 112 is designed to provide a positive DC voltage when its pass frequency is present, and filter 114 a negative voltage when its pass frequency is present, or vice versa.

Figure 2A:
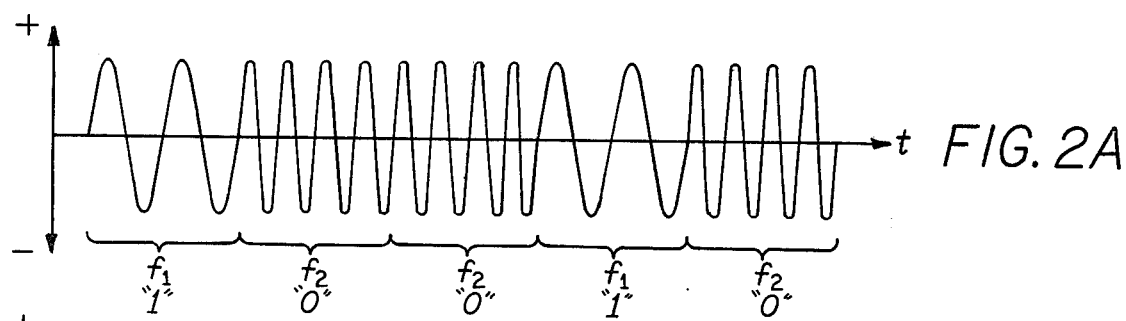
FIGS. 2A–2F present a schematic diagram illustrating signals present at various locations in the circuit of FIG. 1.

The type of signal that would enter lock-in filter circuit 110 is shown in FIG. 2A. The noise component that circuit 110 would remove is not shown. The wave form, which is only exemplary of the type that may be processed by circuit 110, consists of frequency components $f_1$ and $f_2$. The frequency variations in FIG. 2A are greatly exaggerated for purposes of example. Frequency $f_1$ may represent a digital "1" and $f_2$ a digital "0". In the example of FIG. 2A, the digital sequence would therefore be 10010.

Figure 2B:
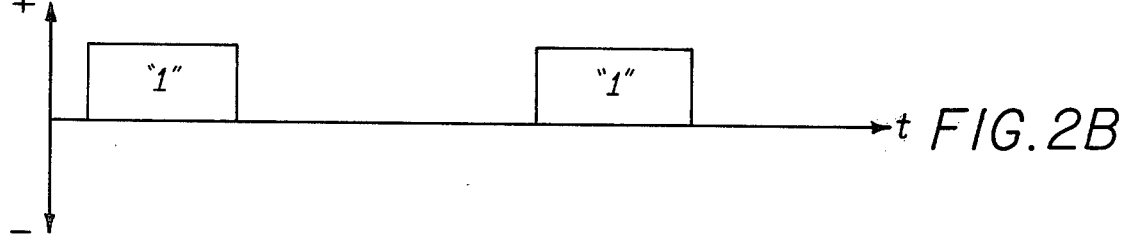
Figure 2C:
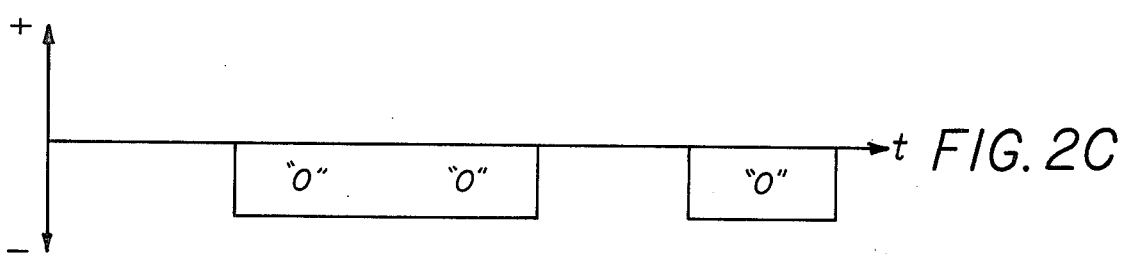
Figure 2D:
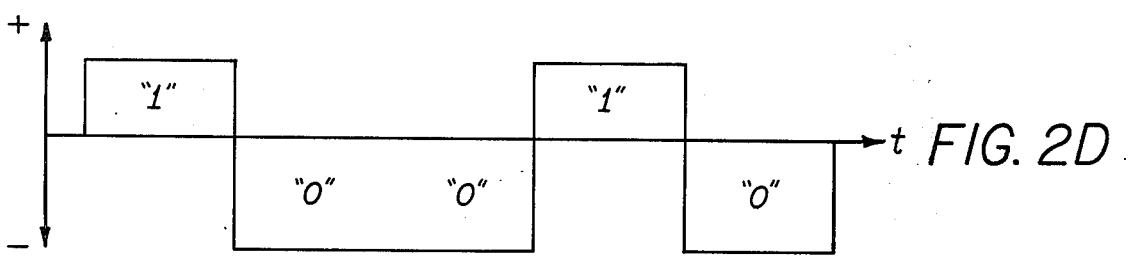

The signal produced by lock-in filter 112 is shown in FIG. 2B. When frequency $f_1$ is present, a positive pulse is produced, and when frequency $f_2$ is present, no pulse of any sort is produced. The opposite is true of the signal produced by lock-in filter 114. It produces a negative pulse whenever $f_2$ is present and no pulse when frequency $f_1$ is present. These two signals are combined through resistors 116 and 118 at node 120 to form the signal shown in FIG. 2D. It is this signal whose informational significance is determined by the present invention.

Figure 2E:
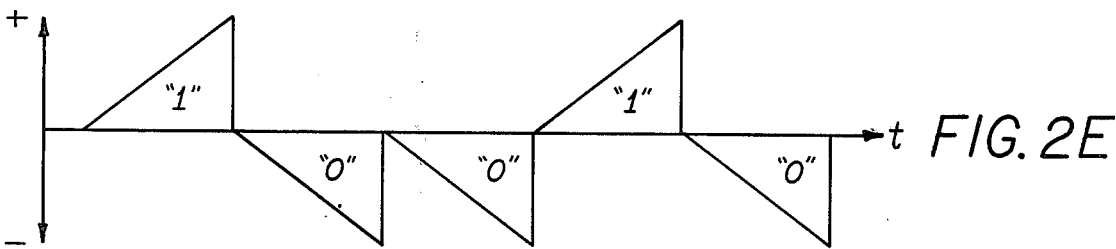
Figure 2F:
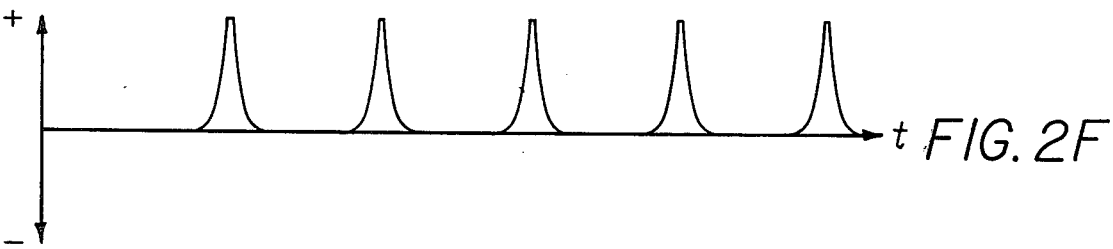

Integrator 122 starts to integrate the resultant voltage from the two lock-in filter channels 112 and 114 at the beginning of each bit and is reset at the end of each bit. Before the reset action, a sample-and-hold switch 136 is closed along enough to charge a storage capacitor 134, which continues to indicate the polarity until the end of the next bit interval. The integrator is reset by momentarily closing switch 128. Switches 128 and 136 are actuated by positive pulses of a bit rate generator 139. The output of integrator 122 is shown in FIG. 2E. The pulses produced by circuit 139 to operate switches 128 and 136 are shown in FIG. 2F.

The bit rate generator must by synchronized with the bit rate of the signal received by pick-up 100. The source of this signal is at the bottom of a borehole, and it is not possible to effect synchronization by any direct reference to the downhole bit generator. Synchronization is instead achieved by adjusting the frequency of a free-running bit rate oscillator 152 for maximum final voltage of the output of integrator 122. The frequency and phase of the bit rate oscillator 139 then matches the downhole bit rate.

Figure 3:
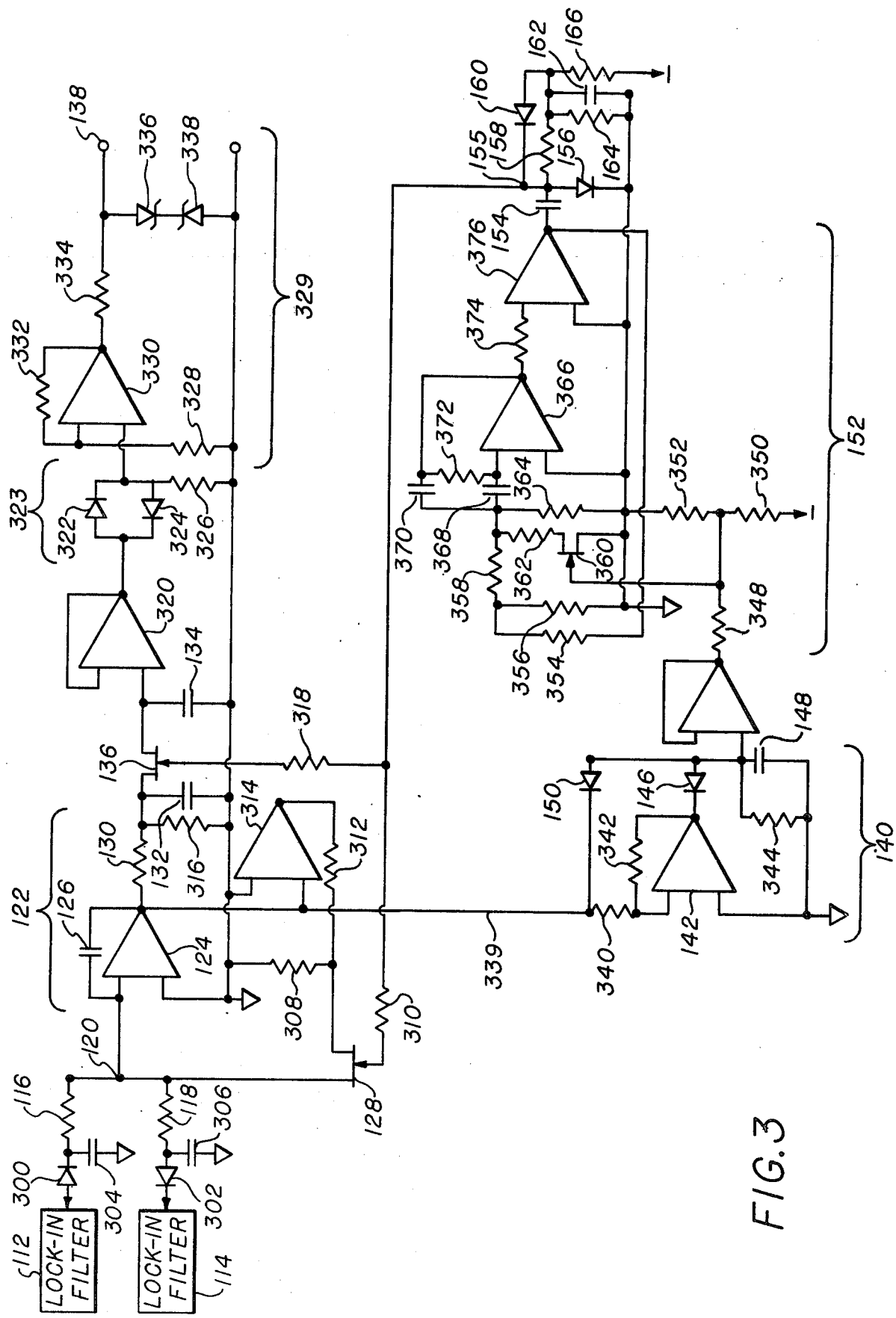
FIG. 3 is a detailed schematic diagram of the circuit of FIG. 1.

Referring to FIG. 3, lock-in filter 112 is connected to the anode of a diode 300. The cathode of diode 300 is connected to a grounded capacitor 304 and a series resistor 116. Similarly, lock-in filter 114 is connected to the cathode of a diode 302. The anode of diode 302 is connected to a grounded capacitor 306 and a series resistor 118. Resistors 116 and 118 are connected at node 120.

Node 120 is connected to a first input of a differential amplifier 124 in a integrator circuit 122. The other input of the differential amplifier is grounded. A feedback capacitor 126 is connected around differential amplifier 124. The output of differential amplifier 124 is connected through a series resistor 130 and across a grounded resistor 316. Also connected in parallel with resistor 316 is a capacitor 132. The source terminal of a field effect transistor (FET) switch 136 is connected to capacitor 132, and the drain terminal is connected to a grounded capacitor 134.

Capacitor 134 is connected to one input of a differential amplifier 320, which is connected in the unity gain configuration. The output of the differential amplifier is connected in series with parallel, oppositely polarized diodes 322 and 324, which comprise an interval signal holding means 323. The output of this diode combination is connected across a grounded resistor 326 to the input 327 of a limiting circuit 329. Input 327 is also the input of a differential amplifier 330. A feedback resistor 332 is connected around differential amplifier 322 to its other input, which is also connected across a grounded resistor 328. The output of amplifier 330 is connected in series with a resistor 334, which is connected across two grounded, series-connected, oppositely polarized zener diodes 336 and 338. The anode of diode 336 is connected to the signal output 138 of the bit identification system.

The output of differential amplifier 124 is also connected to one input of a differential amplifier 314 and the input 339 of a frequency control circuit 140. The second input of differential amplifier 314 is grounded, and its output is connected through a resistor 312 to the source of a FET switch 128. The drain of FET 128 is connected to node 120. Resistor 312 and the source of FET 128 are connected through a resistor 308 to ground.

The input 339 of frequency control circuit 140 is connected through a resistor 340 into a first input of a differential amplifier 142. A portion of the output signal is fed back through a resistor 342 to the first input. The second input of differential amplifier 142 is grounded, and its output is connected to the cathode of a diode 146. The anode of diode 146 is connected to the anode of a diode 350, whose cathode is connected to input 339. The anodes of diodes 146 and 150 are connected to one input of a differential amplifier 346 and to a grounded parallel combination of a resistor 344 and a capacitor 148.

Amplifier 346 is connected in the unity gain configuration, and its output is connected to a resistor 348. Resistor 348 is then connected both to the gate of a FET 360 and resistors 350 and 352. Resistor 350 is connected on its other side to a source of negative supply of voltage, and resistor 352 to ground. The drain of FET 360 is grounded, and its source is connected to a resistor 362. Resistor 362 is connected to a resistor 358, which in turn is connected to resistors 354 and 356. Resistor 356 is grounded, while resistor 354 is connected to the output of a differential amplifier 376. Resistor 362 is also connected to a resistor 364, which in turn is connected to ground, and to parallel capacitors 368 and 370. Connected between the two capacitors on the other side from resistor 362 is a resistor 372. Resistor 372 and capacitor 368 are connected to one input of a differential amplifier 366, whose other input is grounded. Resistor 372 and capacitor 370 are connected to the output of amplifier 366. The output of amplifier 366 is also connected through a resistor 374 to one input of a differential amplifier 376, whose other input is grounded. The output of amplifier 376 is connected through a capacitor 154 to the cathode of a diode 160, to a resistor 158 and to the anode of a diode 156 at a node 155. The cathode of diode 156 is grounded, and the anode of diode 160 is connected through a resistor 166 to a supply of negative voltage. Resistor 158 is connected to a resistor 164, a capacitor 162 and between diode 160 and resistor 166. Capacitor 162 and resistor 164 are grounded. Node 155 is connected through a resistor 318 to the gate of FET 136 and through resistor 310 to the gate of FET 228.

In the operation of the circuit of FIG. 3, the positive and negative DC voltages from lock-in filters 112 and 114 are mixed at the input of integrator 122. Diodes 300 and 302 act as rectifiers to insure that only signals of desired polarity emanate from lock-in filters 112 and 114. Capacitors 304 and 306 act to smooth ripples from the signals emanating from the two filters.

Integrator 112 is formed by the combination of operational amplifier 124, capacitor 126 and resistors 116 and 118. At the end of the integrating interval, amplifier 314 is driven to saturation with the same polarity as the output of amplifier 124. A part of this voltage is returned to the inverting input of amplifier 124 when FET switch 128 is closed by a positive pulse on its gate. If the duration of the pulse is sufficient, the output of amplifier 124, acting as negative feedback, integrates to zero and remains at zero until the pulse is removed. The integration occurs only as long as pulse is present at FET 128. If the pulse is either too long or too short, a non-zero voltage remains on capacitor 132. It is necessary for synchronization that the pulse duration be altered so that this voltage is eliminated.

The terminal output voltage from amplifier 124 at the end of the integration period is divided by resistors 130 and 316 and retained on capacitor 132 until transferred to capacitor 134 by the closing of FET switch 136, simultaneous with the closing of FET switch 128. The output of amplifier 320 follows the voltage across capacitor 134 at low impedance and remains the same polarity until reversed by the closing of FET switch 136 at the end of a bit interval. The voltage must exceed ±0.6 volts to pass diodes 322 or 324 to reach the input of limiting circuit 329. Amplifier 330 and zener diodes 336 and 338 in the limiting circuit limit the final output to a constant level regardless of delay that may occur in the voltage across capacitor 134.

An interval between digital words may be indicated by switching between the pair of frequencies an even number of times within the normal bit interval. The final integrator output under these conditions has no net contribution from the signal and indicates only the unbalanced noise level. Diodes 322 and 324 hold the output of amplifier 330 at zero to mark an interval.

The positive pulses that switch FET switches 128 and 136 must occur at the downhole bit rate and coincide with the end of the bit interval; otherwise, the terminal voltage of the integrator is not always at its maximum value when the integrator is reset. The circuit of FIG. 3 generates pulses at the timed intervals which maintain maximum integrator output and match the downhole bit rate.

The switching pulses are generated by the square wave output of amplifier 376. Amplifiers 366 and 376, with their associated components, comprise an oscillator 152. The frequency of the oscillator is controlled by resistor 364, shunted by resistor 362, in series with FET switch 360 acting as a variable resistor. Capacitor 148 is charged to the most negative terminal integrator voltage through diode 150 and the most positive voltage through the inversion of amplifier 142 and diode 146. Amplifier 346 supplies current to drive the gate of FET switch 360 towards a negative potential.

With the gate of FET switch 360 at minimum negative bias, resistor 364 is adjusted for a frequency slightly higher than the known bit rate, e.g. 7.8 Hz for a known bit rate of 7.7 Hz. Current from amplifier 346 then drives the gate of FET switch 360 more negative, increasing the shunting resistance and decreasing the frequency until the voltage across capacitor 126 is a maximum, indicating that the pulse rate coincides with the downhole bit rate.

The switching pulse is generated on the positive swing of the square wave output of amplifier 376. The pulse is biased negative to insure no conduction of FET switches 128 and 136 between pulses. Diodes 156 and 160 limit the pulse to the range necessary to prevent damage to FET's 128 and 136.

To reemphasize the operation of the bit rate oscillator 152, it is adjusted for a frequency known to be too high when the control voltage is shorted to ground through FET switch 360. Any voltage causes the resistance of the junction FET 360 to increase and thereby lower the frequency. As the frequency is lowered the controlled voltage increases until it reaches a maximum. Beyond maximum the control relation is reversed, i,e., further decrease in frequency decreases the control voltage and it is held at the maximum.

This circuit therefore performs a number of important functions. First, it provides a way of integrating a positive signal voltage from one channel added to a negative voltage from another channel over the period of one bit. Second, it insures that the beginning and end of each integration period will coincide with the downhole frequency change. Third, it provides a means of bringing the surface bit rate oscillator into synchronism with the downhole bit rate. Fourth, it provides a simple method of resetting the integrator.

In sum, the present circuit determines which filter loop is carrying the signal in the presence of noise transmitted by the narrow pass bands of the filters, identifies the time of transition from one filter to the other as the signal shifts frequency, and distinguishes a data bit from a noise pulse.

While particular embodiments of the present invention have been shown and described, it is obvious that changes and modifications may be made therein without departing from the true scope and spirit of the invention. It is therefore the intention in the appended claims to include all such changes and modifications.

What is claimed is:

1. Bit identification circuit, comprising:
   means receptive of a periodic signal having positive and negative levels representative of binary bits;
   means for integrating the signal over a selected period; and
   means for varying the selected period until said integrated signal is maximized.

2. Bit identification circuit in accordance with claim 1 wherein the means for varying said selected period comprises:
   means for periodically resetting said integrator at the end of said selected interval; and
   means for varying the period of said resetting means to maximize the level of said integrated signal.

3. Bit identification circuit in accordance with claim 2 wherein the periodic resetting means comprises an oscillator.

4. Bit identification circuit in accordance with claim 1 further including means for storing said integrated signal.

5. A binary signal transmission system comprising:
   a transmitter generating signals of two different frequencies;
   means for selectively switching between the two frequencies at a periodic rate;
   a receiver spaced from the transmitter generating a positive signal level when one frequency is received and a negative signal when the other frequency is received;
   an integrator receptive of the two signal levels;
   circuitry for resetting the integrator at regular intervals; and
   circuitry for varying the resetting interval until the output signal level of the integrator is maximized.

6. In a binary signal transmission system in which binary bits are represented by positive and negative signal levels selectively switched at a periodic bit rate, circuitry for synchronizing the bit rate of a local receiver with the bit rate of a remote transmitter, comprising:
   an integrator receptive of the two signal levels;
   circuitry for resetting the integrator at regular intervals; and
   circuitry for varying the resetting interval until the output signal level of the integrator is maximized.

7. In a signal transmission system in which a signal is selectively switched between two frequencies at a periodic rate, circuitry for continuously determining which of the two frequencies is being received, comprising:
   circuitry for producing a positive signal level when one frequency is received and a negative signal level when the other frequency is received;
   an integrator receptive of the positive and negative signal levels;
   circuitry for providing reset pulses to the integrator; and
   circuitry for varying the frequency of the reset pulses to maximize the output signal level of the integrator.

8. A borehole acoustical signal transmission system, comprising:
   a drill string;
   an acoustical transmitter at a first location in the drill string generating signals of two different frequencies;
   means for selectively switching between the two frequencies at a constant rate;
   an acoustical receiver at a second location in the drill string generating a positive signal when one frequency is received and a negative signal when the other signal is received;
   an integrator receptive of the positive and negative signals;
   circuitry for resetting the integrator at regular intervals; and
   circuitry for varying the resetting interval until the output signal level of the integrator is maximized.

9. A borehole acoustical signal transmission system in accordance with Claim 8 further including means for retransmitting signals in accordance with the signals appearing at the output of the integrator.

10. In a signal transmission system in which a signal is selectively switched between a positive and a negative signal level at a periodic rate, circuitry for continuously determining which of the two signal levels is being received, comprising:
    means for integrating the positive and negative signal levels;
    means for storing the integrator output; and
    means for determining the polarity of the stored signal.

11. Circuitry for synchronizing an integrator with a periodic signal being integrated, comprising:
    means for storing the output of the integrator after each integration cycle;
    an oscillator whose frequency is dependent upon the signal level in the storing means; and
    means for resetting the integrator each time a pulse is generated by the oscillator.

12. Bit identification circuit for use in a borehole data transmission system operating at a predetermined downhole bit rate, comprising:
    an integrator;
    means for resetting the integrator output to 0;
    first means for storing the voltage from the integrator;
    second means for storing the voltage from the integrator;
    means for transferring the voltage from the first storing means to the second storing means at the same time the resetting means begins operation;
    voltage output means including signal level limiting means and means for holding the output voltage level at 0 during rapid switching between two signal frequencies to thereby indicate an interval; and
    means for maximizing the integrator output before operation of the resetting means begins by matching the integrator reset rate to the downhole bit rate.

13. A borehole acoustical signal transmission system, comprising:
    a drill string;
    an acoustical transmitter at a first location in the drill string generating a signal representative of digital data;
    an acoustical receiver at a second location in a drill string generating signal pulses in accordance with signals received from the acoustical transmitter;
    an integrator receptive of the signal pulses;
    circuitry for resetting the integrator at periodic intervals; and circuitry for varying the resetting interval until the output signal level of the integrator is maximized.

14. A borehole acoustical signal transmission system in accordance with claim 13 further including circuitry for producing an identified data signal when the output of the integrator reaches a predetermined level.

15. A borehole acoustical signal transmission system in accordance with claim 14 further including means in the drill string for acoustically retransmitting the identified data signal.

16. Circuitry for distinguishing a data signal bit from a noise pulse, comprising:
an integrator;
circuitry for resetting the integrator at periodic intervals;
circuitry for varying the resetting interval until the output signal level of the integrator is maximized; and
circuitry for producing an identified data signal when the output of the integrator reaches a predetermined level.

17. Circuit for distinguishing a data signal bit from a noise pulse, comprising:
an integrator receptive of a signal containing data signal bits;
circuitry for resetting the integrator at periodic intervals;
circuitry for initiating operation of the resetting circuitry whenever said integrator receives a data signal bit; and circuitry for producing an identified data signal when the output of said integrator reaches a predetermined level.

* * * * *